(12) United States Patent
Stiesdal

(10) Patent No.: US 7,956,484 B2
(45) Date of Patent: Jun. 7, 2011

(54) WIND TURBINE, METHOD FOR MOUNTING A WIND TURBINE AND METHOD FOR ADJUSTING AN AIR GAP BETWEEN A ROTOR AND A STATOR OF A GENERATOR OF A WIND TURBINE

(75) Inventor: Henrik Stiesdal, Odense C (DK)

(73) Assignee: Siemens Aktiengesellschaft, Munich (DE)

( * ) Notice: Subject to any disclaimer, the term of this patent is extended or adjusted under 35 U.S.C. 154(b) by 405 days.

(21) Appl. No.: 12/218,068

(22) Filed: Jul. 10, 2008

(65) Prior Publication Data

US 2009/0015020 A1 Jan. 15, 2009

(30) Foreign Application Priority Data

Jul. 10, 2007 (EP) .................................... 07013519

(51) Int. Cl.
*F03D 9/00* (2006.01)
(52) U.S. Cl. ......................................................... 290/55
(58) Field of Classification Search .................. 290/55
See application file for complete search history.

(56) References Cited

U.S. PATENT DOCUMENTS

| 6,285,090 | B1 * | 9/2001 | Brutsaert et al. ................. | 290/55 |
| 6,483,199 | B2 | 11/2002 | Umemoto et al. | |
| 6,504,260 | B1 * | 1/2003 | Debleser ......................... | 290/44 |
| 6,781,276 | B1 | 8/2004 | Stiesdal et al. | |
| 6,911,741 | B2 * | 6/2005 | Pettersen et al. ................. | 290/44 |
| 7,075,192 | B2 * | 7/2006 | Bywaters et al. ............... | 290/55 |
| 7,119,453 | B2 | 10/2006 | Bywaters et al. | |
| 7,547,985 | B2 * | 6/2009 | Takaichi et al. ................. | 290/55 |
| 7,550,863 | B2 * | 6/2009 | Versteegh ........................ | 290/44 |
| 7,642,668 | B2 * | 1/2010 | Kim et al. ......................... | 290/55 |
| 7,736,125 | B2 * | 6/2010 | Bagepalli et al. ............. | 415/126 |
| 2001/0035651 | A1 | 11/2001 | Umemoto et al. | |
| 2006/0071575 | A1 * | 4/2006 | Jansen et al. .................... | 310/266 |
| 2006/0152014 | A1 | 7/2006 | Grant et al. | |
| 2006/0152016 | A1 * | 7/2006 | Bywaters et al. ............... | 290/55 |
| 2009/0015020 | A1 * | 1/2009 | Stiesdal .......................... | 290/55 |
| 2009/0058094 | A1 * | 3/2009 | Jansen et al. .................... | 290/55 |
| 2009/0134630 | A1 * | 5/2009 | Stiesdal ........................ | 290/55 |
| 2010/0045047 | A1 * | 2/2010 | Stiesdal ........................ | 290/55 |

FOREIGN PATENT DOCUMENTS

| EP | 1 641 102 A1 | 3/2006 |
| JP | 2009019625 A * | 1/2009 |
| WO | WO 00/60719 A1 | 10/2000 |
| WO | WO 02/05408 A1 | 1/2002 |
| WO | WO 02/057624 A1 | 7/2002 |
| WO | WO 03/023943 A2 | 3/2003 |

OTHER PUBLICATIONS

Rasmussen P et al: Multipole, Permanent Magnet Generator Studies and Planned Prototypes; European Community Wind Energy Conference, Jan. 1993, p. 643-650, XP000606076.

* cited by examiner

*Primary Examiner* — Joseph Waks

(57) ABSTRACT

A wind turbine including a bedplate, a main shaft and a direct drive generator is disclosed. The main shaft pivots relative to the bedplate by a first and second bearing. The direct drive generator includes a rotor connected to the main shaft and a stator containing a hollow part like housing substantially arranged around the rotor and containing a first endplate, a second endplate and a casing element connecting the first and the second endplate to each other. The second endplate of the stator is at least indirectly attached to the bedplate.

15 Claims, 3 Drawing Sheets

WIND TURBINE, METHOD FOR MOUNTING A WIND TURBINE AND METHOD FOR ADJUSTING AN AIR GAP BETWEEN A ROTOR AND A STATOR OF A GENERATOR OF A WIND TURBINE

CROSS REFERENCE TO RELATED APPLICATIONS

This application claims the benefits of European application No. 07013519.9 filed Jul. 10, 2007 and is incorporated by reference herein in its entirety.

FIELD OF INTENTION

The invention relates to a wind turbine comprising a direct drive generator. The invention concerns also a method for the mounting of the wind turbine as well as a method for the adjustment of an air gap between a rotor and a stator of the direct drive generator of the wind turbine.

BACKGROUND OF THE INVENTION

In principle there are two main types of wind turbines in view of the drive configuration of a wind turbine. The first type of a wind turbine is the more classical type of a wind turbine comprising a gearbox arranged between the main shaft and a generator of the wind turbine. The second type of a wind turbine is a gearless type comprising a direct drive or a directly driven generator. Such a direct drive generator can be made as a synchronous generator with winded rotor or with permanent magnets attached to the rotor, or it can be designed as an alternative type of a generator. Independently from the type of a direct drive generator it is desirable that the width of the air gap between the rotor and the stator of the generator is preferably maintained constantly or at least within certain tolerances during the operation of the wind turbine and the direct drive generator respectively even when the arrangement of wind turbine rotor, main shaft and direct drive generator is subject to loads.

Therefore different bearing arrangements for a drive configuration of a wind turbine comprising a direct drive generator were developed. Up to now the classical bearing arrangement of a direct drive generator is a two-bearing arrangement. Thereby the rotor of the generator which is connected to the wind turbine rotor is supported with two bearings towards a stationary inner shaft or a fixed inner shaft. The stator is on one side attached to the stationary inner shaft. Thus the rotor can turn relatively to the stator around the stationary inner shaft. Wind turbines with such a design are e.g. described in EP 1 641 102 A1 and U.S. Pat. No. 6,483,199 B2. The drawback of such a design is that the one-side support of the stator makes it difficult to maintain the width of the air gap at least substantially constant at the unsupported side of the stator in particular when the entire generator structure is not only subject to gravity and mass inertia but also to unbalanced magnetic pull. In order to reduce this drawback a direct drive generator with such a two-bearing arrangement needs a large and heavy stator support structure capable of absorbing relatively large bending moments of the stator. Such a stator structure is e.g. described in WO 02/05408 A1 wherein the stator structure comprises a support construction having a plenty of support arms.

In an alternative design the two-bearing arrangement is replaced with a single bearing with a stationary inner bearing part attached to a stationary inner shaft and a rotating outer bearing part supporting the rotor of the direct drive generator. Wind turbines comprising a direct drive generator with a single bearing are disclosed in US 2006/0152014 A1 and WO 02/057624 A1. But the replacement of the two bearings with a single bearing does not substantially change the drawback of the unilaterally supported stator structure.

In some further solutions the stationary inner shaft concept is replaced with a rotating shaft concept. Since the stator of the generator is supported on both sides according to the rotating shaft concept, it is easier to maintain the width of the air gap between the rotor and the stator of the generator at least substantially constantly. There are two known variants of the rotating shaft concept, one with a two-bearing arrangement and one with a four-bearing arrangement.

According to the two-bearing arrangement the bearings of the generator act as bearings of a main shaft for the wind turbine which main shaft is connected to the wind turbine rotor. The stator structure is supported towards the main shaft and attached to a bedplate of the wind turbine. Wind turbines having such a design are disclosed in U.S. Pat. No. 7,119,453 B2 and WO 03/023943 A2. A drawback of this design is that the stator structure needs to be dimensioned to absorb and transfer all wind turbine rotor loads, i.e. the weight of the wind turbine rotor and all asymmetric aerodynamic loads to maintain the width of the air gap within the necessary tolerances. On large wind turbines this leads to very heavy and expensive stator structures.

In the four-bearing arrangement the main shaft of the wind turbine which is connected to the wind turbine rotor on its one end is supported by its own two bearings and carries at its other end the direct drive generator. The direct drive generator has a two-bearing arrangement for the centering of the rotor inside the stator. An example of such a wind turbine is described in U.S. Pat. No. 6,781,276 B1. In this main shaft mounted arrangement the generator stator is carried by the generator rotor and torque is transferred from the generator to the wind turbine bedplate through a torque arm arrangement. The torque arm arrangement needs to comprise some kind of flexibility, e.g. implemented with rubber elements, to allow for minor misalignments between the main shaft-generator structure and the turbine bedplate. The bilateral support of the stator on the rotor enables for a relatively lightweight stator structure. The main drawback of this design is that a total of four bearings are required, and that the full torque has at least partially to pass through these bearings. For large wind turbines this means comparatively large and expensive bearings. Furthermore, for large wind turbines the torque arm arrangement becomes a comparatively substantial and heavy structure.

SUMMARY OF INVENTION

It is therefore an object of the present invention to provide a wind turbine as initially mentioned in such a way, that the design of the wind turbine is preferably simplified and less expensive. It is a further object of the present invention to indicate a method for the mounting of the wind turbine as well as a method for adjusting an air gap between a rotor and a stator of a generator of the wind turbine.

The first object is inventively achieved by a wind turbine comprising a bedplate, a main shaft and a direct drive generator comprising a rotor and a stator containing a hollow part like housing substantially arranged around the rotor and containing a first endplate, a second endplate and a casing element connecting the first and the second endplate with each other, wherein the main shaft is at least indirectly pivoted relatively to the bedplate by a first and a second bearing, the rotor is preferably firmly, but detachably connected to the main shaft, the first endplate of the stator is arranged or supported on the rotor or the main shaft by a third bearing and the second endplate of the stator is at least indirectly preferably firmly, but detachably attached to the bedplate and the second endplate is at least partially in a certain extent flexible in the directions of a centre axis of the main shaft. The present invention pursues a new concept of a three-bearing arrangement for a wind turbine comprising a directly driven generator. On the one hand the main shaft is preferably firmly, but detachably connected on one side to the wind turbine rotor comprising a hub and rotor blades, is according to one embodiment on the other side preferably firmly, but detachably connected to the rotor of the generator and is pivoted relatively to the bedplate of the wind turbine with two main bearings. Thus the rotor of the generator is able to turn together with the main shaft. On the other hand the first endplate of the stator is arranged or supported on the rotor by a third bearing, whilst the second endplate of the stator is at least indirectly preferably firmly, but detachably attached to the bedplate. In this manner one bearing is saved in comparison to the aforementioned rotating shaft concept in particular in comparison to the four-bearing arrangement. Thus the design of the wind turbine is simplified and less expensive. Nevertheless the inventive concept permits the maintenance of a relatively narrow, well defined air gap between the rotor and the stator of the generator because of the two-side support of the stator in form of the first and the second endplate. Thus also the stator is able to be constructed more lightweight. Thereby the two bearings of the main shaft carry substantially the weight of the rotor and substantially this part of the weight of the stator that is not at least indirectly supported on the bedplate. Approximately half of the weight of the stator is carried from the two bearings of the main shaft and half of the weight of the stator is supported on the bedplate.

A three bearing structure can be sometimes statically undetermined. In this case any misalignments due to mounting tolerances or any deformations arising as a result of gravity or external loads to the main shaft and/or the direct drive generator could potentially lead to an uneven load distribution between the three bearings of the wind turbine which in turn could cause a premature bearing failure. The second endplate of the stator is therefore at least partially in a certain adequate extent flexible in the directions of a centre axis of the main shaft. According to a variant of the invention the second endplate of the stator is substantially perpendicularly arranged relatively to the centre axis of the main shaft. Thus the potential problem of a static indeterminacy of the three bearing arrangement is in case of this embodiment of the invention eliminated by establishing a sufficient flexibility of the second endplate in the directions of the centre axis of the main shaft which second endplate is at least indirectly supported on the fixed structure of the wind turbine bedplate. The second endplate acts like a membrane supporting the stator substantially firmly in the radial direction so as to maintain the air gap, but flexing readily so as to enable e.g. a bending of the main shaft with no major resistance. Thereby the second endplate is flat and has such dimensions e.g. in dependence of the material and/or the structure of the second endplate that the second endplate has a comparatively little bending stiffness. It simply flexes passively when e.g. the main shaft is shifted a bit by deflection, while at the same time maintaining the width of the air gap.

According to another embodiment of the invention the second endplate which is at least indirectly preferably firmly, but detachably attached to the bedplate is arranged substantially close to the first or the second bearing. Thus the second endplate is supported on the fixed structure of the wind turbine bedplate near one of the main bearings of the main shaft which is positive in view of the stability of the drive construction.

According to a variant of the invention the hollow part like housing of the stator is a hollow cylinder like housing, the first endplate is a ring like endplate, the second endplate is a ring like endplate and the casing element is a cylinder barrel element. Thereby the cylinder barrel element connects the first and the second endplate to each other and carries the electrical stator elements.

According to a further variant of the invention the main shaft is supported with the first and the second bearing in a bearing housing arranged on the bedplate. The bearing housing is able to be arranged directly on the bedplate or indirectly e.g. by a retaining arm.

In an embodiment of the invention the second endplate of the stator is at least indirectly attached to the bearing housing. Preferably the second endplate comprises a flange which is directly or by means of a connection piece connected to a flange of the bearing housing.

In a further development of the invention the main shaft of the wind turbine carries the rotor. In one embodiment of the invention the main shaft comprises a flange and the rotor comprises a flange wherein the flange of the main shaft and the flange of the rotor are attached to each other. In this case the generator is as a rule located on the downwind side of the tower of the wind turbine.

In an alternative embodiment of the invention the rotor is arranged around the main shaft. Thereby the main shaft is preferably supported with the first and the second bearing on a stationary inner shaft of the wind turbine which is at least indirectly arranged on the bedplate. In a development of the invention the stationary inner shaft is attached to a retaining arm which is arranged on the bedplate. In this case the generator is as rule located on the upwind side of the tower of the wind turbine.

According to a variant of the invention the rotor comprises a projection carrying the third bearing. Thus the third bearing is arranged on the projection of the rotor and supports the first endplate of the stator.

According to another embodiment of the invention the stator comprises at least one arrest and/or adjustment element for arresting the rotor and the stator relatively to each other and/or for adjusting the air gap between the rotor and the stator. Typically the stator comprises a plurality of arrest and/or adjustment elements e.g. arranged or located on the inside or the inner perimeter of a ring like flange of the second endplate of the stator and arranged around the rotor and/or the main shaft and/or a flange of the rotor or the main shaft. Preferably the arrest and/or adjustment elements are radially adjustable in relation to the main shaft or the rotor. According to an embodiment of the invention the arrest and/or adjustment elements are adjustable towards the ring like flange of the rotor which is connected to the flange of the main shaft. Thus it is on the one hand possible by radially adjusting all arrest and/or adjustment elements towards the ring like flange of the rotor to fix or arrest the rotor and the stator relatively to each other e.g. during the transport of the direct drive generator. On the other hand it is possible by an individual adjustment of each arrest and/or adjustment element to adjust the air gap between the rotor and the stator in particular to adjust a substantially constant width of the air gap around the perimeter.

The further object of the invention is achieved by a method for the mounting of the afore described wind turbine wherein for the mounting of the direct drive generator the at least one arrest and/or adjustment element is adjusted for arresting the rotor relatively to the stator, the direct drive generator is oriented relatively to the main shaft and at least indirectly attached to the main shaft, the second endplate is at least indirectly preferably firmly, but detachably attached to the bedplate and the at least one arrest and/or adjustment element is loosened to enable a rotation of the rotor relatively to the stator.

The third object of the invention is achieved by a method for the adjustment of the air gap between the rotor and the stator of the direct drive generator of the afore described wind turbine, wherein the at least one arrest and/or adjustment element is adjusted for arresting the rotor relatively to the stator, the at least indirect attachment of the second endplate to the bedplate is loosened, the air gap between the rotor and the stator is adjusted by the respective adjustment of the at least one arrest and/or adjustment element, the second endplate is at least indirectly, preferably firmly, but detachably reattached to the bedplate and the at least one arrest and/or adjustment element is loosened to enable a rotation of the rotor relatively to the stator.

BRIEF DESCRIPTION OF THE DRAWINGS

The invention will in the following be explained in more detail with reference to the schematic drawings, wherein.

DETAILED DESCRIPTION OF INVENTION

Figure 1:
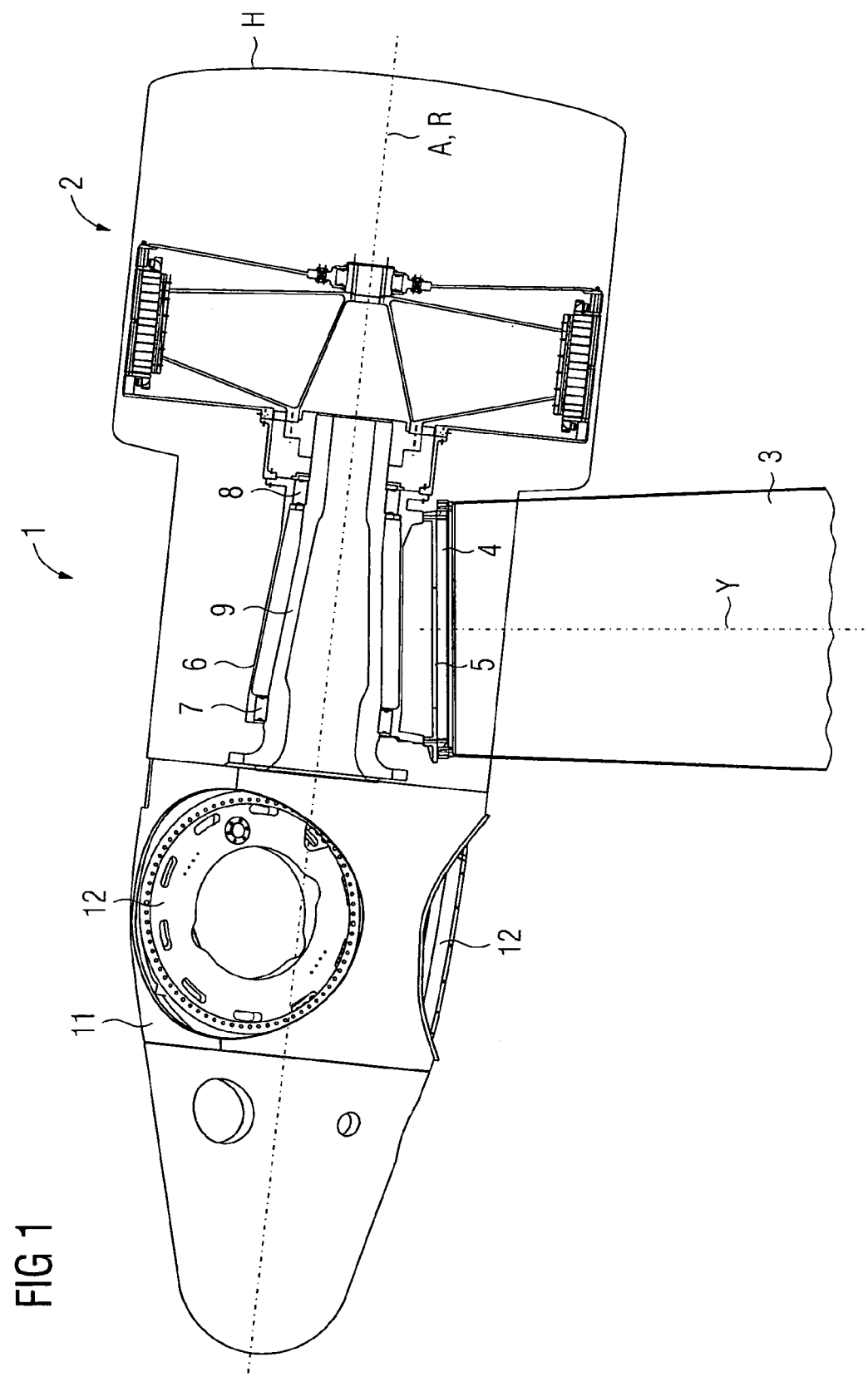
FIG. 1 shows a part of an inventive wind turbine.

FIG. 1 shows schematically a first embodiment of an inventive wind turbine 1 comprising a direct drive generator 2 which is arranged on the downwind side of a tower 3 of the wind turbine 1.

A tower flange 4 is arranged on the top of the tower 3. A bedplate 5 is attached to the tower flange 4. The wind turbine 1 comprises in a not explicitly shown manner a yaw system for turning the bedplate 5 of the wind turbine around the axis Y together with the other components of the wind turbine 1 which are directly or indirectly attached to the bedplate 5.

Figure 2:
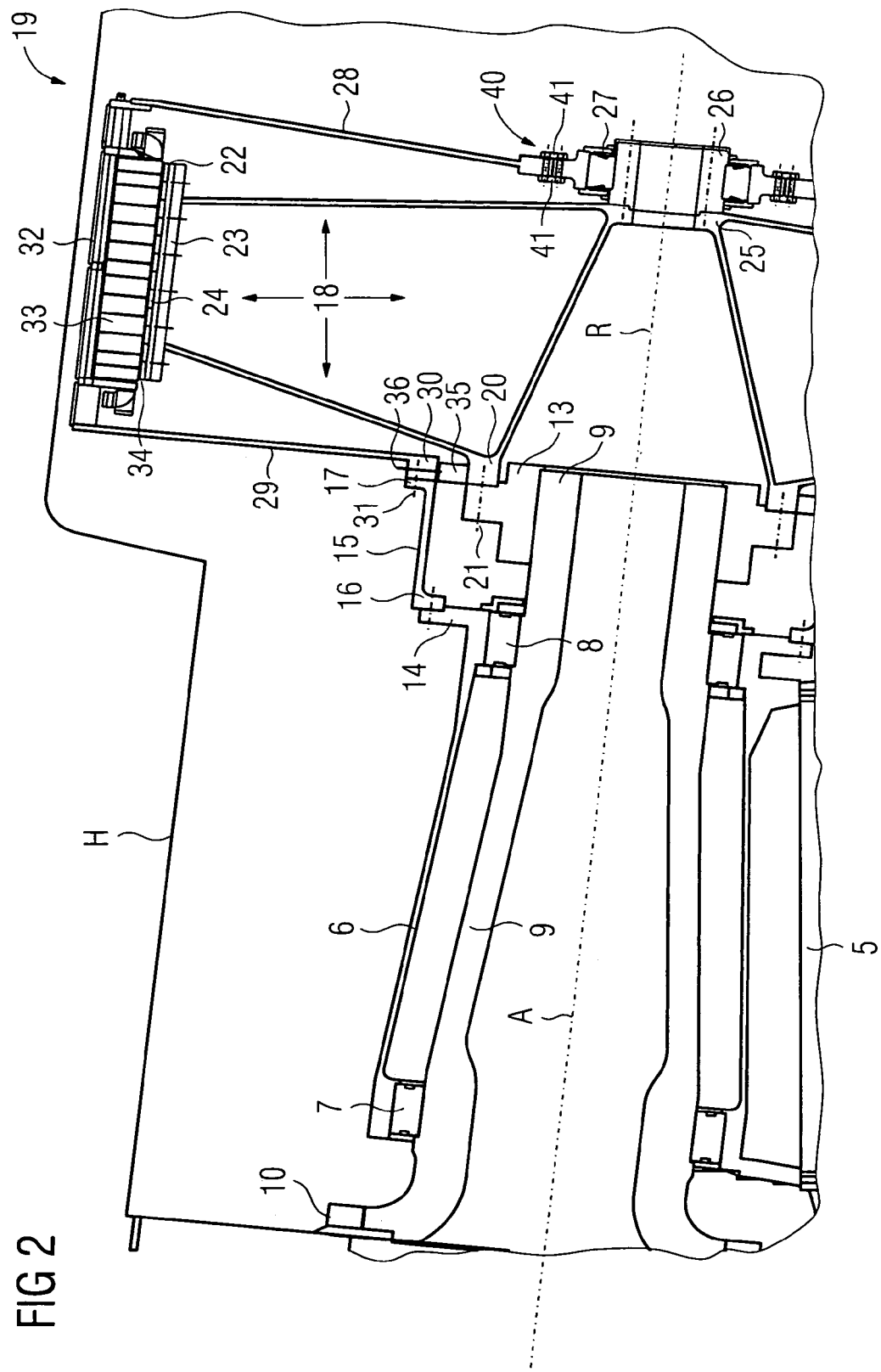
FIG. 2 shows in an enlarged illustration the main shaft and a part of the direct drive generator of the wind turbine of FIG. 1

FIG. 2 shows in more detail a bearing housing 6 firmly arranged on the bedplate 5. The bearing housing 6 comprises two main bearings 7 and 8. Whilst each fixed part of the main bearings 7, 8 is attached to the bearing housing 6, each rotating part of the main bearings 7, 8 is attached to a main shaft 9. In case of the present embodiment of the invention the main shaft 9 is a hollow main shaft. On the front end the main shaft 9 comprises a ring like flange 10. The ring like flange 10 is firmly, but detachably connected to a hub 11 of the wind turbine 1. The hub 11 comprises three mounting devices 12 for three not shown, but well known wind rotor blades.

On the rear end the main shaft 9 comprises a ring like flange 13 firmly connected to the main shaft 9. Also the bearing housing 6 comprises on the rear end a ring like flange 14. In case of the present embodiment of the invention a tube like connection piece 15 with a first flange 16 on its front side and with a second flange 17 on its rear side is attached to the ring like flange 14 of the bearing housing 6. The ring like flange 14 of the bearing housing 6 and the first flange 16 of the tube like connection piece 15 are bolted together.

In case of the present embodiment of the invention the direct drive generator 2 is arranged on the main shaft 9 and on the bearing housing 6 and thus on the bedplate 5. The direct drive generator 2 is one unit comprising a generator rotor 18 and a generator stator 19.

The rotor 18 having a centre axis R comprises on the front side a ring like flange 20. The ring like flange 20 is mounted on the ring like flange 13 of the main shaft 9 with flange bolts 21. Thus the ring like flange 20 of the rotor 18 and the ring like flange 13 of the main shaft 9 are firmly, but detachably bolted together. In case of the present embodiment of the invention not in detail shown permanent magnets 24 are mounted on the outer side or the outer perimeter 22 of a ring element 23 of the rotor 18. On the rear side the rotor 18 comprises a lug 25. A tube like projection 26 is attached to the lug 25 by bolts. A third bearing 27 is arranged on the tube like projection 26.

The stator 19 comprises a first flat ring like or a rear stator endplate 28 attached to the substantially stationary part or housing of the third bearing 27. An isolating arrangement 40 comprising two concentric e.g. fibreglass rings 41 isolates the metallic housing of the third bearing 27 and the metallic first endplate 28 from each other. So no currents can pass through the third bearing 27.

Furthermore the stator 19 comprises a second flat ring like or front stator endplate 29 having a ring like flange 30. The ring like flange 30 of the second endplate 29 and the ring like flange 17 of the tube like connection piece 15 are bolted together by flange bolts 31. A tube like casing element in form of a cylinder barrel element 32 connects the first ring like endplate 28 and the second ring like endplate 29 to each other. Not in detail shown, but well known electrical stator elements 33 e.g. the stator winding, the stator yoke and so on are arranged on the inner side or perimeter of the cylinder barrel element 32. The electrical stator elements 33 of the stator 19 and the permanent magnets 24 of the rotor 18 are arranged oppositely to each other with an intermediate ring like air gap 34. In the following it is only spoken from the air gap 34 between the rotor 18 and the stator 19. Thus the rotor 18 can turn together with the main shaft 9 relatively to the stator 19 around the centre axis A of the main shaft 9. Thereby the centre axis A of the main shaft 9 and the centre axis R of the rotor 18 are aligned with each other.

According to the described three-bearing arrangement in particular of the main shaft 9 and the direct drive generator 2 the stator 19 is supported on the rear side with the first endplate 28 on the rotor 18 via the third bearing 27 and is supported on the front side with the second endplate 29 via the bearing housing 6 on the fixed structure of the wind turbine bedplate 5 close to the main bearing 8. Thereby not only one bearing, reaction supports and rubber dampers are saved in comparison to the afore mentioned four-bearing arrangement of the rotary shaft concept but also the stator 19 is supported on both sides with the first and the second endplates 28, 29. This enables a more lightweight stator construction and less dimensions of the stator structure in particular of the stator support structure like the endplates and so on to maintain the width of the air gap 34 within the necessary tolerances along the directions of the centre axis A or R and around the perimeter. Moreover a longer stack length is enabled.

For avoiding situations in which the three-bearing arrangement is statically undetermined the second endplate 29 of the stator 19 which is supported on the fixed structure of the bedplate 5 comprises sufficient flexibility in the directions of the centre axis A or the centre axis R. Thereby the second endplate 29 acts like a membrane supporting the stator 19 substantially firmly in the radial direction so as to maintain the width of the air gap 34, but flexing readily so as to allow e.g. a bending of the main shaft 9 with no major resistance. The second endplate 29 has such dimensions that it has a comparatively little bending stiffness. It simply flexes passively when e.g. the main shaft 9 is shifted a bit by deflection. Thus when a bending of the main shaft 9 to which the rotor 18 is attached occurs the second endplate 29 bends in the directions of the centre axis A or the centre axis R wherein the width of the air gap 34 is maintained substantially constant or within the required tolerances.

As a consequence, in addition to the loads from the wind turbine rotor and the main shaft 9 the two main bearings 7, 8 carry substantially the weight of the rotor 18 and approximately half of the weight of the cylindrical barrel element 32 and the electrical stator elements 33 as well as the weight of the first ring like endplate 28. Approximately the other half of the weight of the cylindrical barrel element 32 and the electrical stator elements 33 as well as the weight of the second ring like endplate 29 is carried by the connection piece 15, the bearing housing 6 and the bedplate 5. The third bearing 27 carries only this part of the weight of the stator 19 that is not supported on the fixed structure of the bedplate 5.

The stator 19 comprises additionally at least one arrest and/or adjustment element 35 for arresting the rotor 18 relatively to the stator 19 and/or for adjusting the air gap 34 between the rotor 18 and the stator 19. In case of the present embodiment of the invention the stator 19 comprises a plurality of arrest and/or adjustment elements in form of pressure shoes 35. The pressure shoes 35 are arranged on the inner perimeter of the ring like flange 30 of the second endplate 29. The pressure shoes 35 are in relation to the centre axis R of the rotor 18 or in relation to the centre axis A of the main shaft 9 radially adjustable with radial effective bolts 36. When a bolt 36 is tightened the respective pressure shoe 35 is adjusted towards or pressed onto the flange 20 of the rotor 18.

As mentioned above the direct drive generator 2 is designed as one unit. Before the shipment and/or the mounting of the generator 2 onto the main shaft 9 and the tube like connection piece 15 the bolts 36 are tightened so as to a firm fit of the pressure shoes 35 onto the flange 20 of the rotor 18 in a position where the air gap 34 between the rotor 18 and the stator 19 is substantially uniform around the perimeter of the rotor 18. In this situation the rotor 18 is arrested relatively to the stator 19. During the mounting the direct drive generator 2 is oriented relatively to the main shaft 9 and brought into a position for a fit of the flange 20 of the rotor 18 onto the flange 13 of the main shaft 9 wherein the centre axis A of the main shaft 9 and the centre axis R of the rotor 18 are substantially aligned with each other. Then the flange bolts 21 are mounted and tightened through not shown access openings in the tube like connection piece 15 and/or the rotor 18. Afterwards the ring like flange 30 of the second ring like endplate 29 and the ring like flange 17 of the tube like connection piece 15 are bolted together with flange bolts 31. Finally the pressure shoes 35 are loosened from the flange 20 of the rotor by unscrewing the bolts 36. Thereby the pressure shoes 35 take in positions near the inner perimeter of the flange 30 of the rotor 18 that the rotor 18 can rotate freely relatively to the stator 19. The air gap 34 retains its original adjustment.

If the air gap 34 should come out of adjustment e.g. during the operation of the wind turbine 1 it can be readjusted in particular by a reversal of some steps of the mounting process.

In a first step the arrest and/or adjustment elements in form of the pressure shoes 35 are adjusted for arresting the rotor 18 relatively to the stator 19. Thereby the bolts 36 are tightened radially so as to a firm fit of the pressure shoes 35 onto the flange 20 of the rotor 18. Then the flange bolts 31 are loosened whereby the attachment between the flange 17 of the tube like connection piece 15 and the flange 30 of the second endplate 29 and thus between the second endplate 29 and the bedplate 5 is loosened. Then the air gap 34 between the rotor 18 and the stator 19 is adjusted or readjusted by the adjustment of the pressure shoes 35 using the radial effective bolts 36. Thereby the different pressure shoes 35 are individually adjusted by the respective radial effective bolts 36 whereas not shown transducer distances are able to be used for the adjustment of the air gap 34. The adjustment is possible because there is some play for connecting the flange 17 of the tube like connection piece 15 and the flange 30 of the second endplate 29 to each other. Once the air gap 34 is as desired, the flange 17 of the tube like connection piece 15 and the flange 30 of the second endplate 29 and thus the second endplate 29 and the bedplate 5 are reattached to each other. Finally the pressure shoes 35 are loosened from the flange 20 of the rotor 18 by unscrewing the bolts 36. Thereby the pressure shoes 35 again take in positions near the inner perimeter of the flange 30 of the rotor 18 that the rotor 18 can rotate freely relatively to the stator 19.

Figure 3:
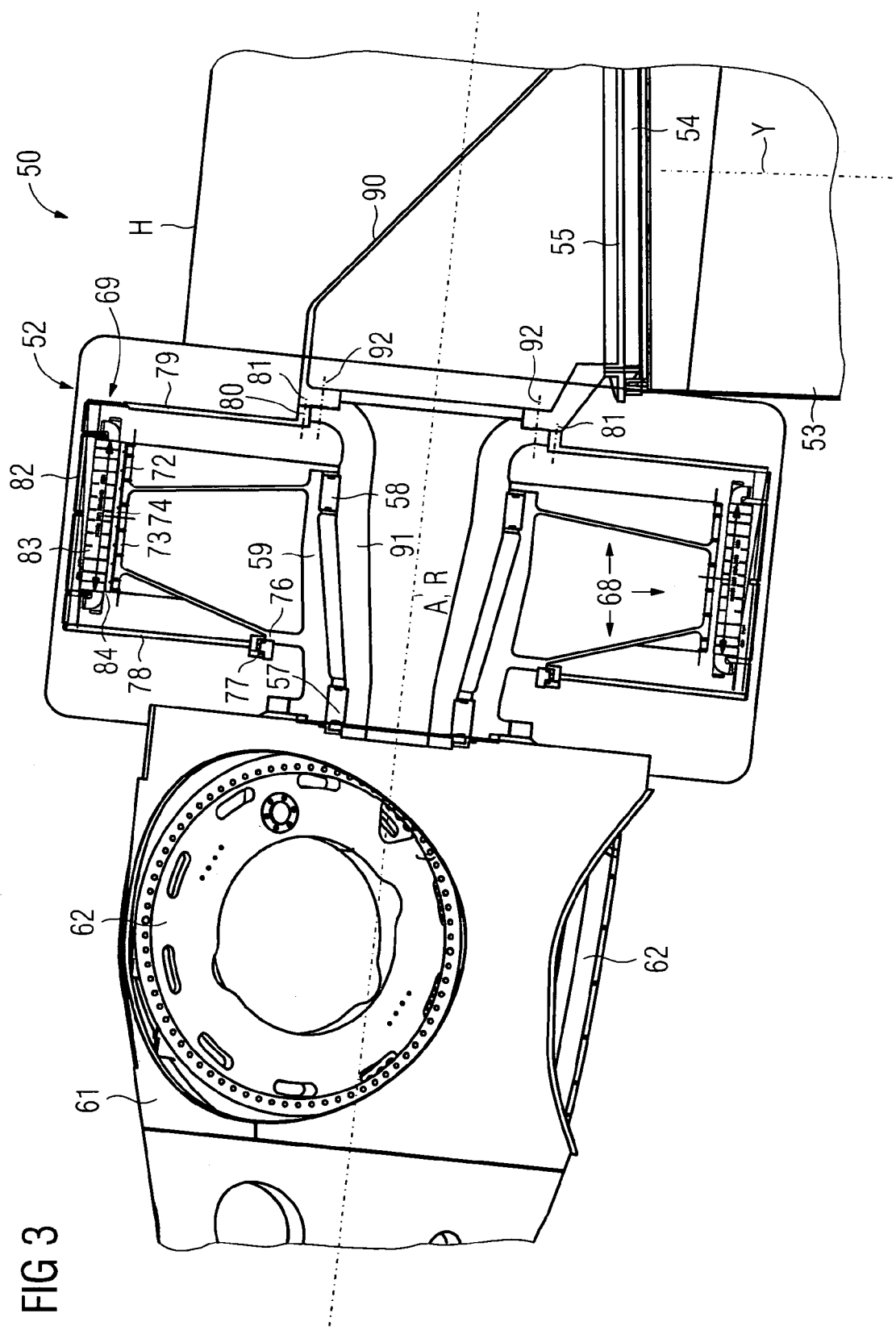
FIG. 3 shows a part of another embodiment of an inventive wind turbine.

In FIG. 3 a part of a second embodiment of an inventive wind turbine 50 is schematically shown. Thereby most of the components of the wind turbine 50 correspond substantially to components of the wind turbine 1 in relation to the construction and/or the function.

The wind turbine 50 comprises a direct drive generator 52 which is arranged on the upwind side of the tower 53.

A tower flange 54 is arranged on the top of the tower 53. A bedplate 55 is attached to the tower flange 54. Also the wind turbine 50 comprises a not explicitly shown yaw system for turning the bedplate 55 of the wind turbine 50 around the axis Y together with the other components of the wind turbine 50 which are directly or indirectly attached to the bedplate 55.

In case of the present embodiment of the invention the wind turbine 50 comprises a retaining arm 90 mounted on the bedplate 55. A hollow stationary inner shaft 91 is attached to the retaining arm 90 by a plurality of bolts 92. A rotatable main shaft 59 is supported on the stationary inner shaft 91 with two main bearings 57, 58 and firmly, but detachably connected to a hub 61. The hub 61 comprises three mounting devices 62 for three not shown, but well known wind rotor blades. Thus the main shaft 59 is able to rotate together with the hub 61 around the centre axis A.

The rotor 68 of the direct drive generator 52 is arranged around and attached to the main shaft 59. The rotor 68 turns together with the main shaft 59. The rotor 68 has a centre axis R aligned with the centre axis A and comprises a ring element 73 provided in case of the present embodiment of the invention with not in detail shown permanent magnets 74 mounted on the outer side or perimeter 72 of the ring element 73. On the front side the rotor 68 has a projection 76 carrying a third bearing 77. The third bearing can also be attached to the main shaft 59 or a projection of the main shaft 59.

The stator 69 of the generator 52 comprises a first ring like endplate 78 attached to the substantially stationary part of the third bearing 77. Furthermore the stator 69 comprises a second ring like endplate 79 having a ring like flange 80. The ring like flange 80 of the second endplate 79 and the retaining arm 90 are firmly, but detachably bolted together by flange bolts 81. A tube like casing element in form of a cylinder barrel element 82 connects the first ring like endplate 78 and the second ring like endplate 79 to each other. The not in detail shown, but well known electrical stator elements 83 e.g. the stator winding, the stator yoke and so on are arranged on the inner side or perimeter of the cylinder barrel element 82. The electrical stator elements 83 of the stator 69 and the permanent magnets 74 of the rotor 68 are arranged oppositely to each other with an intermediate ring like air gap 84. In the following it is again only spoken from the air gap 84 between the rotor 68 and the stator 69. The rotor 68 can turn with the main shaft 59 relatively to the stator 69 around the centre axis A and the centre axis R respectively.

According to the described three-bearing arrangement in particular of the main shaft 59 and the direct drive generator 52 the stator 69 is supported on the front side with the first endplate 78 on the rotor 68 via the third bearing 77 and is supported on the rear side with the second endplate 79 via the retaining arm 90 on the fixed structure of the wind turbine bedplate 55 close to the main bearing 58. The support of the stator 69 on both sides with the first and the second endplates 78, 79 allows again a more lightweight stator construction and less dimensions of the stator structure in particular of the stator support structure like the endplates and so one to maintain the width of the air gap 84 within the necessary tolerances along the directions of the centre axis A or R and around the perimeter. In turn a longer stack length is enabled.

Again the second endplate 79 of the stator 19 which is at least indirectly supported on the fixed structure of the bedplate 55 comprises a certain amount of flexibility in the directions of the centre axis A or the centre axis R for avoiding situations in which the three-bearing arrangement is statically undetermined. As described before the second endplate 79 acts like a membrane supporting the stator 69 substantially firmly in the radial direction so as to maintain the width of the air gap 84, but flexing readily so as to allow e.g. a bending of the main shaft 59 with no major resistance. The second endplate 79 has such dimensions that it has a comparatively little bending stiffness. It simply flexes passively when e.g. the main shaft 59 is shifted a bit by deflection. Thus when a bending of the main shaft 59 to which the rotor 68 is attached occurs the second endplate 79 bends in the directions of the centre axis A or the centre axis R wherein the width of the air gap 34 is maintained substantially constant or within the required tolerances.

Aforesaid two embodiments of inventive wind turbines shown in the FIG. 1, 2 and FIG. 3 are described. In the line with invention are also combinations of the two described embodiments.

The rotor 18 or the rotor 68 can also be considered as a rotor arrangement comprising a rotor support structure e.g. comprising rods and/or plates, a flange, a projection, a ring element provided with permanent magnets and so on. Also the stator 19 or the stator 69 can be considered as a stator arrangement comprising a first ring like endplate, a second ring like endplate, a cylinder barrel element provided with electrical stator elements, other support structures and so on.

The third bearing has the additional advantage over existing designs of wind turbines that it provides the preconditions for a well-defined sealing arrangement in particular when the generator is located on the upwind side of the tower. Thereby a substantially total enclosure of the generator is easier to establish which is particularly of importance for an application offshore and in other problematic environments.

By the way both described wind turbines 1, 50 comprise a housing H normally called the nacelle.

The invention claimed is:
1. Wind turbine comprising:
a bedplate;
a main shaft pivoted relatively to the bedplate by a first and a second bearing; and
a direct drive generator having:
a rotor connected to the main shaft, and
a stator containing a hollow part like housing substantially arranged around the rotor and containing a first endplate, a second endplate and a casing element connecting the first and the second endplate to each other, wherein
the first endplate of the stator is supported on the rotor or the main shaft by a third bearing and
the second endplate of the stator is at least indirectly attached to the bedplate,
wherein the second endplate is substantially perpendicularly arranged relatively to a centre axis of the main shaft and/or wherein the second endplate is at least partially flexible in the directions of the centre axis of the main shaft.

2. The wind turbine according to claim 1, wherein the second endplate is arranged substantially close to the first or the second bearing.

3. The wind turbine according to claim 1, wherein the hollow part like housing of the stator is a hollow cylinder like housing, the first endplate is a ring like endplate, the second endplate is a ring like endplate and the casing element is a cylinder barrel like element.

4. The wind turbine according to claim 1, wherein the main shaft is supported via the first and the second bearing in a bearing housing arranged on the bedplate.

5. The wind turbine according to claim 4, wherein the second endplate of the stator is at least indirectly attached to the bearing housing.

6. The wind turbine according to claim 1, wherein the main shaft carries the rotor.

7. The wind turbine according to claim 1, wherein the main shaft comprises a flange, the rotor comprises a flange and wherein the flange of the main shaft and the flange of the rotor are attached to each other.

8. The wind turbine according to claim 1, wherein the rotor is arranged around the main shaft.

9. The wind turbine according to claim 8, wherein the main shaft is supported with the first and the second bearing on a stationary shaft which is at least indirectly arranged on the bedplate.

10. The wind turbine according to claim 9, wherein the stationary shaft is attached to a retaining arm arranged on the bedplate.

11. The wind turbine according to claim 1, wherein the rotor comprises a projection carrying the third bearing.

12. The wind turbine according to claim 11, wherein the stator comprises an arrest and/or adjustment element for arresting the rotor and the stator relatively to each other and/or for adjusting the air gap between the rotor and the stator.

13. The wind turbine according to claim 12, wherein the arrest and/or adjustment element is arranged on a flange of the second endplate.

14. The wind turbine according to claim 12, wherein the arrest and/or adjustment element is radially adjustable.

15. The wind turbine according to claim 12, wherein the arrest and/or adjustment element is adjustable towards a flange of the rotor which is connected to a flange of the main shaft.

* * * * *